United States Patent
Ho (10) Patent No.: US 6,754,634 B1
(45) Date of Patent: *Jun. 22, 2004

(54) METHOD FOR SCHEDULING TRANSPORTATION RESOURCES

(76) Inventor: William P. C. Ho, 4914 N. Vista View Cir., Spokane, WA (US) 99212

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 962 days.

(21) Appl. No.: 09/053,880

(22) Filed: Apr. 1, 1998

(51) Int. Cl.$^7$ .............................................. G06F 17/60
(52) U.S. Cl. ................... 705/6; 705/5; 705/1
(58) Field of Search ................... 705/6, 5, 1

(56) References Cited

U.S. PATENT DOCUMENTS 5,832,453 A * 11/1998 O'Brien .................. 705/6

* cited by examiner

Primary Examiner—Tariq R. Hafiz
Assistant Examiner—Akiba Robinson-Boyce
(74) Attorney, Agent, or Firm—Perkins Coie LLP (57) ABSTRACT

An improved transportation scheduling method for scheduling trips using multiple vehicles, with each of the vehicles having a trip manifest. The method comprises the steps of first generating a usability matrix that determines which of the vehicles is usable with each of the trips. Next, a determination is made as to a best trip of the trips to be scheduled next. A determination is next made as to the best vehicle from the set of vehicles for accommodating the best trip. Then, a determination is made as to the best insertion pair for the trip manifest for the best vehicle for the best trip and updating the trip manifest to include the best insertion pair. Finally, the usability matrix is updated to reflect the scheduling of the best trip to the best vehicle. The steps are repeated until all of the trips have been scheduled.

14 Claims, 7 Drawing Sheets

Microfiche Appendix Included
(2 Microfiche, 163 Pages)

FIGURE 1

|  | $V_1$ | $V_2$ | $V_3$ | $V_4$ | $V_5$ |
|---|---|---|---|---|---|
| $T_1$ | Y | Y | Y | Y | Y |
| $T_2$ | Y | Y | Y | Y | N |
| $T_3$ | Y | N | N | N | N |
| $T_4$ | N | Y | Y | Y | N |
| $T_5$ | Y | Y | Y | N | Y |
| $T_6$ | Y | N | Y | N | Y |
| $T_7$ | N | N | Y | N | Y |
| $T_8$ | N | Y | Y | Y | N |

FIGURE 6

METHOD FOR SCHEDULING TRANSPORTATION RESOURCES

MICROFICHE APPENDIX

This application includes a microfiche appendix including 2 sheets of microfiche and 163 frames of material.

TECHNICAL FIELD OF THE INVENTION

The present invention relates to the scheduling of transportation resources, and more particularly, to a method for heuristically constructing a schedule.

BACKGROUND OF THE INVENTION

Transportation scheduling is the process of planning how to move items from one location to another location using a fleet of carriers and under a set of restrictive constraints. One example is demand-response para-transit scheduling. In this example, wheelchair-bound and ambulatory customers make requests by telephone for round trip transportation from home to medical appointments, shopping, community centers, etc. . . . A fleet of vehicles must provide service under a multitude of constraints such as: (1) honoring a requested pick up time, (2) dropping the customer off before, but at most 60 minutes before, the appointment time, (3) and planning for much slower travel speed during rush hours.

Transportation scheduling takes a collection of trip requests as its set of subgoals, and a fleet of vehicles as its resources. The scheduling process constructs a set of manifests, one for each vehicle. A manifest is an ordered sequence of stop events. Each event has an associated location (either pickup or dropoff) and an assigned time.

The set of manifests or schedule must be realistic (known in the art as "streetability"), satisfy all domain constraints (known in the art as "correctness"), and be of high quality (known in the art as "goodness").

Prior art attempts to solve the transportation scheduling problem have been varied and are exemplified by U.S. Pat. Nos. 5,715,165, 5,692,125, 5,623,413, 5,623,404, 5,619,695, 5,177,684, and 4,926,343. Although these prior art attempts have been moderately successful, some of these methods are computationally intensive. Thus, there is still a need for an easily implementable method for transportation scheduling that accurately models the problem and can be operated in real time.

SUMMARY OF THE INVENTION

An improved transportation scheduling method for scheduling a plurality of trips $T_1-T_n$ using a plurality of vehicles $V_1-V_n$, each of said plurality of vehicles having a trip manifest is disclosed. The method comprises the steps of: (a) generating a usability matrix that determines which of said plurality of vehicles $V_1-V_n$ is useable with each of said plurality of trips $T_1-T_n$; (b) determining a best trip of said plurality of trips $T_1-T_n$ to be scheduled next; (c) determining a best vehicle from said plurality of vehicles $V_1-V_n$ for accommodating said best trip; (d) determining a best insertion pair into said trip manifest of said best vehicle for said best trip and updating said trip manifest to include said best insertion pair; (e) updating said usability matrix to reflect the scheduling of said best trip on said best vehicle; and (f) repeating steps (a)–(e) until all of the trips in said plurality of trips $T_1-T_n$ have been scheduled or determined to be unschedulable.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention will be described in the context of a transportation scheduling problem. However, it will be appreciated that the methods taught herein may be applied to a multitude of other types of problems as described below.

The transportation problem must be faithfully modeled. Some of the complicating factors include the geographic model which determines streetability, time constraints and non-time constraints which determine correctness, and quality metrics used to judge schedule goodness.

The key to producing an executable schedule is to use location-to-location travel times which are accurate with respect to the geographic region being serviced. Travel times should reflect having to go around a barrier such as a sheer cliff, having to cross a river at the nearest bridge, having to get on the highway at the appropriate entry and exit ramps when doing so will reduce travel time, having to adjust for rush hour speeds during rush hour time periods, having to go around downtown when doing so will reduce travel time, and having to adjust for severe weather conditions such as a snowstorm or icy roads.

One type of constraint is time constraint. In addition to accurate location-to-location travel times, there are many other time constraints which must be accounted for. Dwell time is the time to load the passenger at the pickup location and the time to unload the passenger at the dropoff location (dwell time is usually longer for a wheelchair passenger than for an ambulatory passenger). The requested trip is anchored in time by either the pickup ("pick me up at my house at 9:00 am") or the dropoff ("I have a doctor's appointment at 11:00 am"). If the trip is pickup-anchored, the pickup must be made within, for example, a 60-minute window starting at the requested pickup time. If the trip is dropoff-anchored, the dropoff must be made within, for example, a 60-minute window ending at the requested dropoff time.

A passenger does not have to be delivered directly from pickup to dropoff location. This allows for ride-sharing to use vehicles more efficiently (e.g. picking up and dropping off other passengers along the way). But a passenger may be kept on the vehicle no longer than the maximum onboard ride time of, for example, 60 minutes for a trip. The driver's manifest can begin at any time but cannot exceed a predetermined shift length, and must include, for example, a 60 minute lunch break.

Another type of constraint is broadly referred to as non-time constraints. For example, each vehicle has a maximum capacity by passenger type. A passenger van may be outfitted for 6 ambulatory seats, 2 wheelchair seats, and 2 flexible seats which can accommodate either passenger type. The vehicle may not be able to accommodate passengers who have bigger wheelchairs because the driver is physically incapable of loading and unloading those wheelchairs. Some developmentally disabled passengers cannot be on the same vehicle at the same time.

Measures of service cost include total vehicles deployed, total vehicle miles, and total vehicle hours required to actualize the schedule. Measures of customer service include how many ride requests have to be turned down, how many passengers were delivered on-time (pickup-anchored trips and dropoff anchored trips fall within their respective windows), and how many passengers were kept on board beyond the maximum onboard ride time. Measures of ride balance across vehicles include the distribution of trips, the distribution of service hours, and the distribution of service miles.

It has been found that scheduling is a very difficult problem. One reason is subgoal interaction—trips interact by competing for the same resources. At any instant, all trips may be schedulable. But scheduling one of them may cause some trips to immediately become unschedulable, or contribute to some trips eventually becoming unschedulable. The scheduled trip may take the last wheelchair seat on the van, or may pull the van in the opposite direction from another wheelchair trip's pickup location. When a trip becomes unschedulable, there is almost never a clear-cut competing trip to blame.

The order in which trips are scheduled, and how each is scheduled (which vehicle it is assigned to) continually change the "world" for the remaining unscheduled trips. If the scheduler makes poor initial decisions, the schedule is headed irretrievably down an unfavorable result.

This leads to the second reason why scheduling is difficult—combinatorial explosion. The number of possible schedules is factorial with respect to the number of trips to be scheduled. As such, a schedule cannot be guaranteed to be optimal unless all possible schedules are generated and examined. This is computationally impractical for even a relatively small scheduling application. Therefore, scheduling systems try to construct good schedules by making decisions heuristically.

The scheduling problem is defined as a problem of moving around in a state space. A state space representation is specified by a starting state, a set of rules that define legal state transitions, and what constitutes a final state.

A "state" is a snapshot taken after each constructive step of the scheduling process which captures: 1) the set of manifests constructed so far, with their attributes, 2) the set of subgoals yet to be scheduled, with their attributes, 3) the set of resources useable by at least one unscheduled subgoal, with their attributes, 4) the set of other state variables.

The "starting state" has the set of null manifests, the set of all subgoals (trip requests), the set of all resources (vehicles), and initial values for attribute variables and other state variables.

The single "state transition rule" has 3 parameters, which are determined in a parent state: 1. an unscheduled subgoal, 2. a resource useable by that subgoal, and 3. a pair of stops in that resource's manifest to insert the subgoal's pickup and dropoff stops after.

The state transition rule performs the following actions to generate a child state: 1. extend the schedule using the specified parameters, and 2. propagate the consequences and enforce all constraints by: a. update the set of manifests and their attributes, b. update the set of subgoals and their attributes—the subgoal just scheduled, and all subgoals which become unschedulable as a result are deleted, c. update the set of resources and their attributes—resources which become useless to all unscheduled subgoals are deleted, and d. update the set of other state variables. A final state is reached when the set of unscheduled subgoals is null.

States are connected by state transitions creating a "complete tree" of "nodes" (states) and "links" (state transitions) with one "root node" (starting state) and many "leaf nodes" (final states). The terms "node", "link", "root node", and "leaf node" are interchangeable with "state", "state transition", "starting state", and "final state", respectively.

The path from the root node to a leaf node represents one possible scheduling process as defined by the sequence in which subgoals are selected and scheduled. The level of the node, counted from the root node, is a count of how many subgoals have been scheduled in that node.

All prior art deterministic algorithms for solving NP-complete problems (finding the optimal solution) take an exponential time. Lewis et al., "The Efficiency of Algorithms," *Scientific American*, Vol. 238, No. 1, January 1987. Since this is computationally impractical, the state of the art in scheduling for non-linear real-world applications relies on heuristic algorithms.

One prior art heuristic approach is described in Hart et al., "A Formal Basis of the Heuristic Determination of Minimum Cost Paths," *IEEE Transactions on SSC*, Vol. 4, 1968 The Hart method begins at the root node and "generates" only that part of the complete tree necessary to reach a "good" leaf node. An adaptation of the Hart method is the weighted scoring function (WSF), which seeks to measure the "goodness" of a solution. This prior art approach is a heuristic best-first search algorithm that finds a "good" solution by generating a single node per level in the search tree.

For the transportation scheduling problem, a passenger is transported on a vehicle between pickup and dropoff locations, possibly picking or dropping other passengers along the way. The transportation scheduling problem has several characteristics:

1. Subgoals (trips) are not related to each other.
2. Resources (vehicles) move.
3. Achievement of subgoals are interleaved throughout scheduling (trips are ride-shared).
4. Vehicle location, movement paths between stops, and time needed to move are key variables.
5. The ordering of subgoals assigned to the same resource is the primary scheduling issue.
6. Whether a subgoal can use a resource is complex because the trip has time-constrained pickup and dropoff stops to be inserted into a dynamic manifest for a vehicle that is moving all the time.

In addition, for the transportation scheduling problem, an important practical consideration is that every site has a unique service region with unique geographic features. Every site has its own definition of the streetability, correctness, and goodness of schedules. Further, these definitions are almost certain to change over time.

What is a "good" schedule to one site may not be a "good" schedule to another. One site may want to minimize vehicles deployed to the exclusion of all other considerations. Another site which has more than enough vehicles may emphasize customer service over service cost. But over time, that site's policy may change as the number of trip requests begins to tax the vehicle capacity. Therefore, a solution to the transportation scheduling problem should be able to quickly and easily be adjustable to meet the desired parameters of a site.

The present invention, as further described below, attempts to satisfy the foregoing requirements and goals. To summarize the features of the present invention, constraints are organized into a modular library of constraints, each implemented as a single C programming language function. Each constraint is enforced or not enforced depending on the settings in a parameter file which is read by a scheduler whenever it is invoked. The parameter file is essentially a bank of on/off switches in one-to-one correspondence to the constraints in the constraint library. Site customization of constraints to be enforced/ignored is a matter of setting the switches in the parameter file. When a new constraint pops up, it is added to the library by writing a single new function and adding a single new switch to the parameter file. When a constraint is changed, a copy of the pre-change constraint is made, renamed, and updated to reflect the change. The pre-change version of the constraint is kept intact but turned off. A new switch is added for the post-change constraint and turned on.

Further, the present invention separates the domain-independent decision-making mechanism from the domain knowledge. The decision-making mechanism is encapsulated as a generic scheduler engine. Domain knowledge is organized so that each recognized knowledge type is assigned a representational format with a standard interface to the generic scheduler engine. Every piece of knowledge of that type is encoded in that format, and the decision-engine is designed to work with the standard interface, with no dependence on the content that lies behind the standard interface. In this way, newly represented pieces of knowledge are immediately useable and cannot introduce side-effects.

The set of constraints to be enforced can and will often differ from site to site. The strategy to control scheduling will probably vary from site to site. The geographic region knowledge is guaranteed to vary from site to site—some examples are location of rivers and bridges, different speed regions, highways and ramps, barriers, and so on. In the present invention, domain knowledge is organized by collecting all instances of one knowledge type, representing each instance in the associated format, and entering them into one modular library for selective use. The current set of libraries include one each for constraints, preferences, contexts, strategies, and geographic region representations. "Context" is a knowledge type for generic scheduling. "Geographic region representation" is a knowledge type specific to transportation scheduling. "Strategy" is a library strategy.

The preference and context libraries are similarly composed of one C function per preference or context. Contexts and preferences compose the strategy language. The standard preference interface is to accept a set of candidates and return a subset of candidates which meet the preference. The subset returned may be the null set. The standard context interface is to return "context verified" or "context not verified." Each strategy is conceptually a structured "program" of calls to context and preference functions using the construct 'if context X returns "context verified" in current state, use the following layered filter structure of preferences for instantiating the state transition rule; else move to next context.' The context chain which is defined has as the last element a default context which only returns "context verified." Each strategy in the strategy library is a single C function corresponding to that "program." The standard strategy interface is to accept a set of candidates and return a single best candidate.

The appropriate strategy module is referenced by name in a parameter file which is read by the scheduler whenever it is invoked. Site customization of strategy is a matter of naming it in the parameter file. The decision engine makes a generic call to use the strategy, whatever it may be. In the strategy function, calls are made to the appropriate contexts and the associated preferences, whatever they may be.

When a new context or preference pops up, it is added to the appropriate library by writing a single new function which is immediately available for use by being named in any strategy. When a context or preference is changed, it is changed in place. Strategies which use the context or preference by name immediately change behavior appropriately without editing. When a new strategy is designed, it is added to the strategy library by writing a single new function which is immediately available to be named in the parameter file. When a strategy is changed, a copy of the pre-change strategy is made, renamed, and updated to reflect the change. The pre-change version of the strategy is kept intact.

The geographic region library is composed of a collection of C functions per unique site representation. Each collection has the same set of function names, but each function can have different contents. Collectively, the functions capture the region's geographic features. One of the functions is distinguished as the only function known by the decision engine, and is named "TOracle." The TOracle standard interface accepts two locations, each a stop associated with some trip. It uses the other functions to determine and return the travel time between the locations at the time of day of the trip(s) involved.

Each entry in the library is named "1-TO-<region>.c" where <region> is the region name. The appropriate entry is pulled in at compile time to create a site-customized scheduler. For every site, the geographic region entry is created and added to the library. If change is needed, this single entry is changed.

The new algorithm architecture composed of a generic decision engine and libraries of knowledge types enables rapid shrink-wrapping of the present invention to a site during installation, and rapid adaptation of the present invention to the inevitable site policy changes over time. Each library is a growing knowledge repository. Any new instance of an existing knowledge type can be added to the library with no side-effect, and is immediately available for use by all sites. Any new knowledge type, such as context, can be captured in its own new library. To use the new knowledge type, the decision engine need only be changed once to recognize the standard interface of the that type's representational format.

As a transportation scheduling application, demand-response para-transit scheduling is done wholly manually or semi-manually. In the process, a repository of bits and pieces of human expertise has been developed as sub-strategies to apply under certain conditions or in certain situations. There is no site with a single constant strategy to apply regardless of situation.

For example, a sub-strategy associated with the start of the service day is to minimize the number of vehicles dispatched into the field at the expense of added service miles in order to try to minimize total service hours. A sub-strategy associated with the end of the service day is to bring in as many of the vehicles as possible to again try to minimize the total service hours. A sub-strategy during the body of the service day is to try to minimize the total vehicle miles and balance the trip load across all vehicles in the field. A sub-strategy associated with a vehicle donated by a wheelchair organization is to try to make at least 75% of its trip load be wheelchair riders. A sub-strategy associated with the day's bottleneck demand period is to try to maximize ride accommodation before any other consideration. And so on.

Each context has an associated sub-strategy to be used. Together, they form the construct 'if context X returns "context verified" in current state, use the following layered filter structure of preferences for instantiating the state transition rule; else move to next context.'

The present invention adds the concept of Travel Oracle—a self-contained geographic region representation that knows about whatever considerations contribute to an accurate calculation of travel time between any two locations.

Shortest time travel path—Travel between two locations is approximated by travel along a horizontal segment and a vertical segment which form a right triangle with the straight line defined by the two locations. TOracle considers two different paths—horizontal segment first or vertical segment first—returning the shorter time as the travel time between origin location and destination location.

Speed regions—Different regions can have different practical speeds. For example, travel within the downtown region proceeds at 12 MPH, while travel in the suburbs proceeds at 30 MPH. TOracle allows representation of regions and assignment of unique speed to each. Travel between two locations may involve more than one speed region.

Speed time periods—Different time periods can have different practical speeds. For example, travel at rush hour within the downtown region proceeds at 8 MPH, while travel in the suburbs between 9 p.m. 5 a.m. proceeds at 35 MPH. TOracle allows representation of time periods for each speed region and assignment of unique speed to each.

Rivers and bridges—Travel between locations on the left side of a river and the right side of a river must cross the river at a bridge. TOracle knows whether travel between any two locations must cross a river. If so, TOracle represents the single location-to-location segment as two location-to-location segments—from the origin location to a useable bridge and from that bridge to the destination. This representation is recursive in case the shortest time to travel between the original pair of locations requires crossing more than one bridge. Both ends of the bridge are tried, and the shorter travel time returned.

Barriers—The river is a special case of a physical barrier to travel. TOracle recognizes barriers and that travel must go around them. As another example of barrier, Neighborhood-1 is located on a high ridge and Neighborhood-2 is located at the foot of the ridge. Travel between them must go around the ridge. TOracle knows whether travel between any two locations must cross a barrier. If so, TOracle represents the single location-to-location segment as two location-to-location segments—from the origin location to an end of the barrier and from that end to the destination. This representation is recursive in case the shortest time to travel between the original pair of locations requires crossing more than one barrier. Both ends of a barrier are tried, and the shorter travel time returned.

Existing features can be edited and new features can be added, from physical features such as highways and ramps to non-physical features such as a driver factor. Driver-1 may be experienced while Driver-2 is new and less familiar with the street system. TOracle returns more conservative travel times for Driver-2 than for Driver-1.

"Contexts" test the values of state variables in determining whether they return "context verified" or not. These variables, which can also be called context attributes, may be any state variable. Many context attributes are also global attributes of the problem to be scheduled. For example, the start and end times of the dynamic bottleneck period for each day's para-transit demand must be determined for the "bottleneck" context to have meaning. One day's bottleneck demand might fall between 9:00 and 10:30 a.m. while the next day's might fall between 9:30 and 10:45 a.m. The start and end times of the periods for the start of the service day and the end of the service day are similarly dynamic and must be determined daily for the associated context to have meaning.

Newly defined contexts may require new state variables to be defined. For example, a suggested strategy is to build skeleton manifests first by scheduling the long trips, and then fleshing them out with the remaining trips, saving short trips for last since they are typically the easiest to fit in. The sub-strategies for building skeleton manifests, fleshing them out, and filling in with the short trips are all slightly different. New contexts are defined for "building skeleton manifests", "fleshing out skeleton manifests", and "filling in with short trips" which introduce new context attributes—the definitions of long and short trips as the distances, for example, that cut off the top 10% longest trips and the bottom 20% shortest trips in the set of all trips. These variables are dynamic attributes of the problem to be scheduled and must be determined daily for the associated context to have meaning.

The present invention bundles trips together which should go on the same vehicle. The present invention defines "same" pickups as pickups that fall in the same 1 mile square and have pickup times which are within 20 minutes of all each other. The present invention defines "close" pickups as pickups that fall in the same 3 mile square and have pickup times which are within 40 minutes of each other. "Same" and "close" dropoffs are similarly defined. The 1 mile, 3 mile, 20 minute, and 40 minute values are parameters which can be set for each site. If two trips have "same" pickups and "same" dropoffs, they are bundled and scheduled on the same vehicle if possible when they are scheduled. If two trips have "same" dropoffs and "close" pickups or "close" dropoffs and "same" pickups, they are bundled and scheduled on the same vehicle if possible when they are scheduled. Trips with "same" dropoffs and not-"same" pickups are collectively called "common-dropoff" trips—a pattern recognized and exploited by human schedulers. "Common-pickup"trips are similarly recognized and exploited.

The demand-response para-transit application is much more real-time, giving rise to a rich set of responsibilities. Batching is still one of the two workhorse responsibilities optimizing the schedule for the next day after the current service day is closed.

The other workhorse responsibility is accepting a ride request by inserting it successfully into an existing schedule for the requested day or refusing the request if no insertion is possible. Requests are made by phone up to 14 days in advance, and same-day requests ("will calls") are made requesting pickup as soon as possible. In either case, the request must be accepted or refused or negotiated in real-time while the caller is on the phone.

Another scheduling responsibility is to adjust for cancellations in real-time so that cancellation-freed capacity is immediately available to subsequent insertion requests.

A whole set of responsibilities are associated with world changes that render the existing schedule suddenly partly or wholly inoperable. For example, a vehicle breaks down or a sudden severe weather change requires all vehicles to reduce travel speed by 20%.

Another responsibility is to repair a manifest which gradually becomes inoperable when its execution lags behind what was planned. Repair is finding one or a set of trips to take away and reschedule on the remaining vehicles.

For each trip in the para-transit domain, the customer can specify either a requested dropoff time (appointment) or a requested pickup time, but not both. So a trip is anchored in time by either the pickup or the dropoff time. Each stop, pickup or dropoff, has a window of legal times associated with it. For a pickup-anchored trip, the pickup stop window is independently determined while the corresponding dropoff window is dependently determined from the pickup window. For a dropoff-anchored trip, the dropoff window is independent and the pickup window is dependent. Before explaining how windows are initialized and maintained throughout scheduling, some terms are defined with sample values. The values are represented in the present invention as parameters which can be customized for each site:

1. PickupAnchorIntervalLength—the length of the independent pickup window. For a typical site, the value is 30 minutes.
2. DropoffAnchorIntervalLength—the length of the independent dropoff window. For a typical site, the value is 60 minutes.
3. EarliestPickupForDropoffAnchor—the earliest pickup time for a dropoff-anchored trip. For a typical site, the value is 65 minutes before the requested dropoff time.
4. DirectTripTravelTime—the time it takes for a vehicle to travel directly from the pickup to the dropoff as determined by the travel oracle (TOracle) for the site.
5. MaximumRideTime—the maximum time that a passenger can be kept on a vehicle between pickup and dropoff. The values are set by the site and are usually dependent on the direct trip travel time. For example, a trip with 10 minute direct trip travel time may have a maximum ride time of 20 minutes, while a trip with 20 minute direct trip travel time may have a maximum ride time of 50 minutes. For the following discussion, I make the simplifying assumption that for a typical site, the maximum ride time is set to 60 minutes for all trips.
6. ShortestAllowedInterval—the shortest window length allowed. For a typical site, the value is 1 minute.
7. LoadTime—the time required to load a passenger at pickup. For a typical site, the value is 1 minute for ambulatory passenger and 5 minutes for wheelchair passenger.
8. UnloadTime—the time required to unload a passenger at dropoff. For a typical site, the value is 1 minute for ambulatory passenger and 5 minutes for wheelchair passenger.

For a pickup-anchored trip, the pickup window is an interval bounded by the requested time (earliest pickup) to the requested time+PickupAnchorIntervalLength (latest pickup). The associated dropoff window is bounded by the earliest pickup time+DirectTripTravelTime (earliest dropoff) and the latest pickup time+DirectTripTravelTime (latest dropoff). If the value of latest pickup+MaximumRideTime is after the latest dropoff time, it extends the dropoff window by becoming the latest dropoff time. Logically, the earliest dropoff occurs if the passenger is picked up at the earliest opportunity and delivered directly to the dropoff. The latest dropoff occurs if the passenger is picked up at the latest opportunity and kept on the vehicle by ride-sharing as long as possible before dropoff. Any minute in the pickup window is a legitimate pickup time and any minute in the dropoff window is a legitimate dropoff time. Any minute outside the respective windows is not a legitimate time for the respective stop.

As example, Trip-1 is requested with a 9:00 pickup. The pickup window is [9:00, 9:30]. If Trip-1 has 15 minute DirectTripTravelTime, then the dropoff window is [9:15, 9:45]. Since the maximum ride time is 60 minutes, the dropoff window is amended to be [9:15,10:30].

For a dropoff-anchored trip, the dropoff window is an interval bounded by the requested time—DropoffAnchorIntervalLength (earliest dropoff) to the requested time (latest dropoff). The associated pickup window is bounded by the earliest dropoff time—DirectTripTravelTime (earliest pickup) and the latest dropoff time—DirectTripTravelTime (latest pickup). If the value of earliest dropoff—MaximumRideTime is before the earliest pickup time, it extends the pickup window by becoming the earliest pickup time. Logically, the earliest pickup occurs if the passenger is dropped off at the earliest legitimate dropoff time after being kept on the vehicle by ride-sharing as long as possible. The latest pickup occurs if the passenger is dropped off at the latest legitimate dropoff time after being picked up and delivered directly to the dropoff.

As example, Trip-2 is requested with a 12:00 dropoff. The dropoff window is [11:00, 12:00]. If Trip-2 has 20 minute DirectTripTravelTime, then the pickup window is [10:40, 11:40]. Since the maximum ride time is 60 minutes, the pickup window is amended to be [10:00,11:40].

But EarliestPickupForDropoffAnchor specifies that the earliest pickup for Trip-2 is 65 minutes before the requested dropoff time or 10:55. So, another step is added. If the value of requested time—EarliestPickupForDropoffAnchor is after the earliest pickup time, it reduces the pickup window by becoming the earliest pickup time. So the pickup window for Trip-2 is amended to [10:55,11:40]. Any minute in the pickup window is a legitimate pickup time and any minute in the dropoff window is a legitimate dropoff time. Any minute outside the respective windows is not a legitimate time for the respective stop.

A scheduling cycle selects the best link as determined by the strategy. The link specifies the best trip, the best vehicle, and the best pair of stops in the vehicle manifest to insert the trip's pickup and dropoff stops after. Once done, the window for all of the stops in the manifest must be adjusted to satisfy all time constraints the site enforces. Some of the time constraints introduced so far are:

C1. The earliest time for a stop cannot be earlier than the earliest time for the preceding stop+the direct travel time between the two stops as determined by TOracle.

C2. The latest time for a stop cannot be later than the latest time for the following stop—the direct travel time between the two stops as determined by TOracle.

C3. Each stop window must be greater than or equal to the ShortestAllowedInterval.

C4. The passenger cannot be kept on the vehicle longer than the MaximumRideTime.

C5. The passenger cannot be picked up more than EarliestPickupForDropoffAnchor before the requested time for a dropoff-anchored trip.

Another important concept of the present invention is the "usability matrix". The usability matrix is a table that can determine whether or not it is possible to schedule a certain trip with a certain vehicle, or generically, scheduling a subgoal with a certain resource. Although further described below, the following are general comments. The usability of a vehicle for an unscheduled trip is not so easily determined because the order of accommodating the trips in any vehicle manifest is the primary task and how it is done determines the quality of the schedule. The vehicle capacity is not a single value—at any minute during the day, it is potentially different from the minute before and the minute after, and changing constantly as a direct result of the process of scheduling. Additionally, instead of one operation to schedule, there are two stops, pickup and dropoff, for each trip that must be scheduled in the vehicle manifest. Therefore there are potentially numerous different insertion points for each trip stop within an intricate, inter-related set of time constraints. Usability of a vehicle for a trip cannot be calculated. It must be generated by trial—inserting the pickup and dropoff stops for a candidate trip after every combination of scheduled stops in the manifest until a successful insertion is found (useable) or all combinations failed (unuseable). Each insertion by trial must be tested by constraint satisfaction to determine if it succeeds (no violation) or fails (violation).

With a general description of the problem and a skeletal description of the present inventions method of solving this problem, presented next is a more specific description of the present invention. Following that description, an actual implementation of the present invention in the C programming language is provided in the microfiche appendix.

The scheduler technique of the present invention is summarized as follows. Assuming that ten trips are to be scheduled (designated as $T_1$–$T_{10}$). The entire set of trips is first examined to determine which trip is to be scheduled first. This determination can be thought of as a series of filters that narrow the total number of trips to a single trip that is to be scheduled next. Once the next trip to be scheduled has been determined, the vehicle that is to be used to execute the trip is determined. As an aid to matching the trip to the vehicle, a "usability matrix" is formed that shows the capability of a vehicle to serve a particular trip. The usability matrix is recalculated after each trip has been scheduled. The determination of the vehicle that is to be used is also done via a filtering mechanism. Finally, once the vehicle has been chosen for the particular trip, the trip must be inserted into the manifest of that chosen vehicle. This next step entails the generation of a set of candidate insertion pairs. This is done by exhaustively searching all possible insertion pairs of the selected trip into the manifest of the vehicle. Each insertion pair that satisfies the predetermined constraints of the system become one of the candidate insertion pairs. The candidate insertion pairs are then filtered to determine the "best" insertion pair. Then the start point and end point of the trip is inserted in the manifest of the vehicle using the best insertion pair. This process is repeated until all of the trips have been scheduled.

Some of the possible filters used in the trip selection process are: (1) selecting long trips (i.e., trips over thirty minutes); (2) trips for wheelchair clients; (3) trips for medical purposes; and (4) trips for frequent clients. If even after all of the filters have been processed and more than one trip remains, the last filter is simply to randomly pick a trip from the remaining candidates. Some of the possible filters used in the vehicle selection process are: (1) vehicles already in service; and (2) vehicles that have not yet been assigned to any trips. Some of the possible filters used in the insertion pair selection process are: (1) least added time to manifest; (2) least added distance to manifest; (3) fewest intervening stops; and (4) shortest ride time. It can be appreciated that other types of filtering criteria may be used and the above list is not meant to be limiting.

Figure 1:
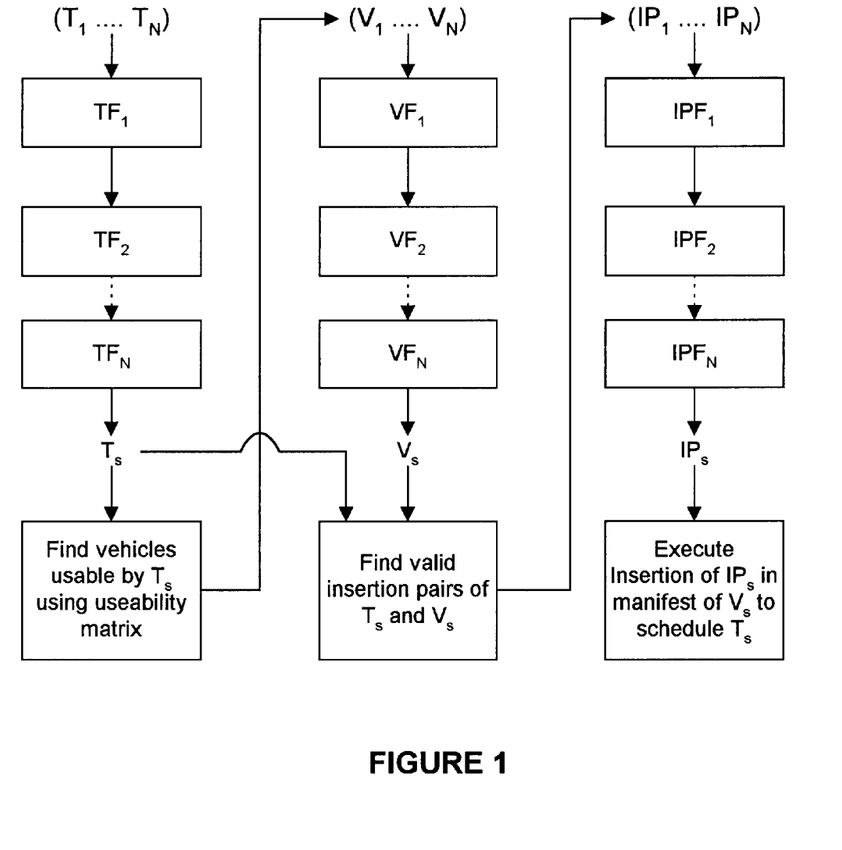
FIG. 1 is an illustration of the overall scheduling method of the present invention.

A diagrammatic illustration of this process is seen in FIG. 1. A set of trips ($T_1$ to $T_n$) is input into a filter bank designated as $TF_1$ to $TF_n$. The result of the filter bank is to select one of the trips from the set of trips ($T_1$ to $T_n$) to be scheduled next, designated as $T_s$. Once $T_s$ has been selected, the vehicles that are capable of satisfying the trip $T_s$ is determined by use of the usability matrix. The set of candidate vehicles is denoted as $V_1$ to $V_n$ and will often be less than the total number of vehicles in service. The candidate set of vehicles is then passed through the vehicle filter bank, designated by $VF_1$ to $VF_n$. The output of the vehicle filter bank is $V_s$. The selected trip $T_s$ and the selected vehicle $V_s$ are then used to determine all of the valid insertion pairs for $T_s$ in the manifest of $V_s$. A valid insertion pair (also known as a candidate insertion pair) is one in which insertion in the manifest of $V_s$ will not cause any constraints to be violated. The set of candidate insertion pairs is denoted as $IP_1$ to $IP_n$ and will almost always be less than the total number of possible insertion pairs. The candidate set of insertion pairs is then passed through the insertion pair filter bank, designated by $IPF_1$ to $IPF_n$. The output of the insertion pair filter bank is $IP_s$. Finally, the selected trip $T_s$ is inserted into the selected vehicle $V_s$ in accordance with the selected insertion pair $IP_s$.

The set of trip filters $TF_1$ to $Tf_n$, the set of vehicle filters $VF_1$ to $VF_n$, and the set of insertion pair filters $IPF_1$ to $IPF_n$ is associated to a "context" of the scheduling process. The context may be variable and change as the scheduling process continues with processing of each trip. Thus, in the example of ten trips to be scheduled, after any arbitrary number of trips have been scheduled, the context may change and a different set of trip filters or vehicle filters may be used or in different order. Indeed, the context may change at any time or remain the same during the scheduling process.

Further, there are two types of situations where the scheduler of the present invention may be used, known as batch mode and insertion mode. Batch mode occurs when a group of trips are to be scheduled all at one time, for example, during a overnight period prior to the day the trips are to be performed. Insertion mode occurs when a group of trips have already been scheduled, but an additional trip is now also to be scheduled.

Figure 2:
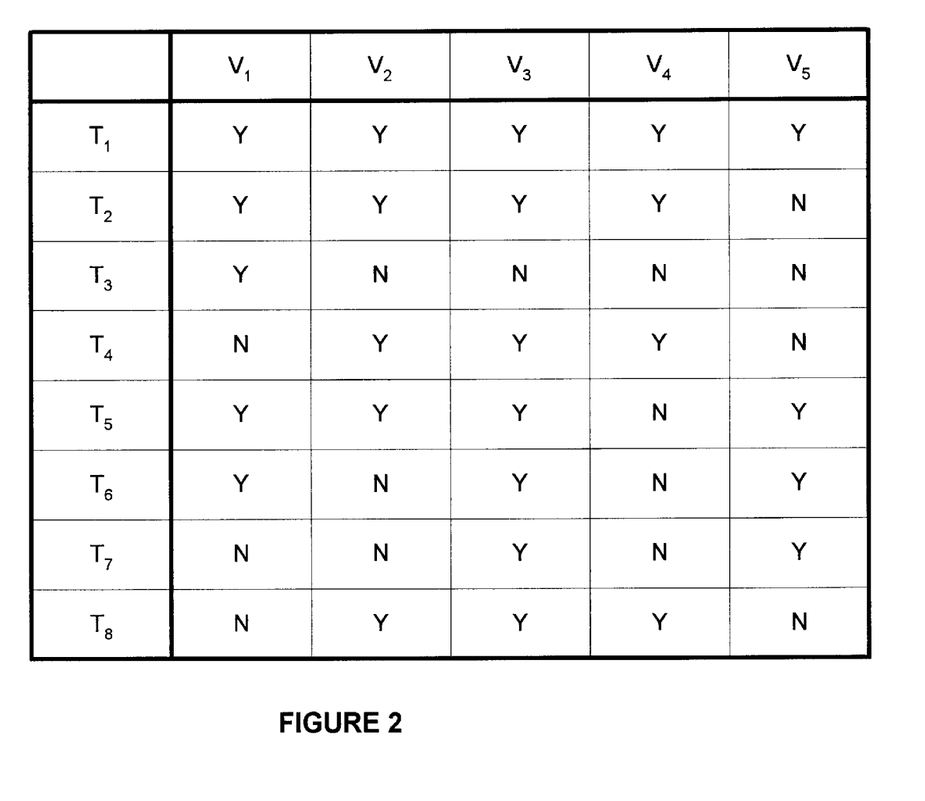
FIG. 2 is a usability matrix used in the present invention.

The first step in the present invention is to generate a usability matrix. A schematic of a useability matrix is shown in FIG. 2. The columns of the matrix represent the various vehicles (designated $V_1$ to $V_5$) that may be put in service. The rows of the matrix (designated $T_1$ to $T_8$) represent the trips that must be scheduled.

Figure 3:
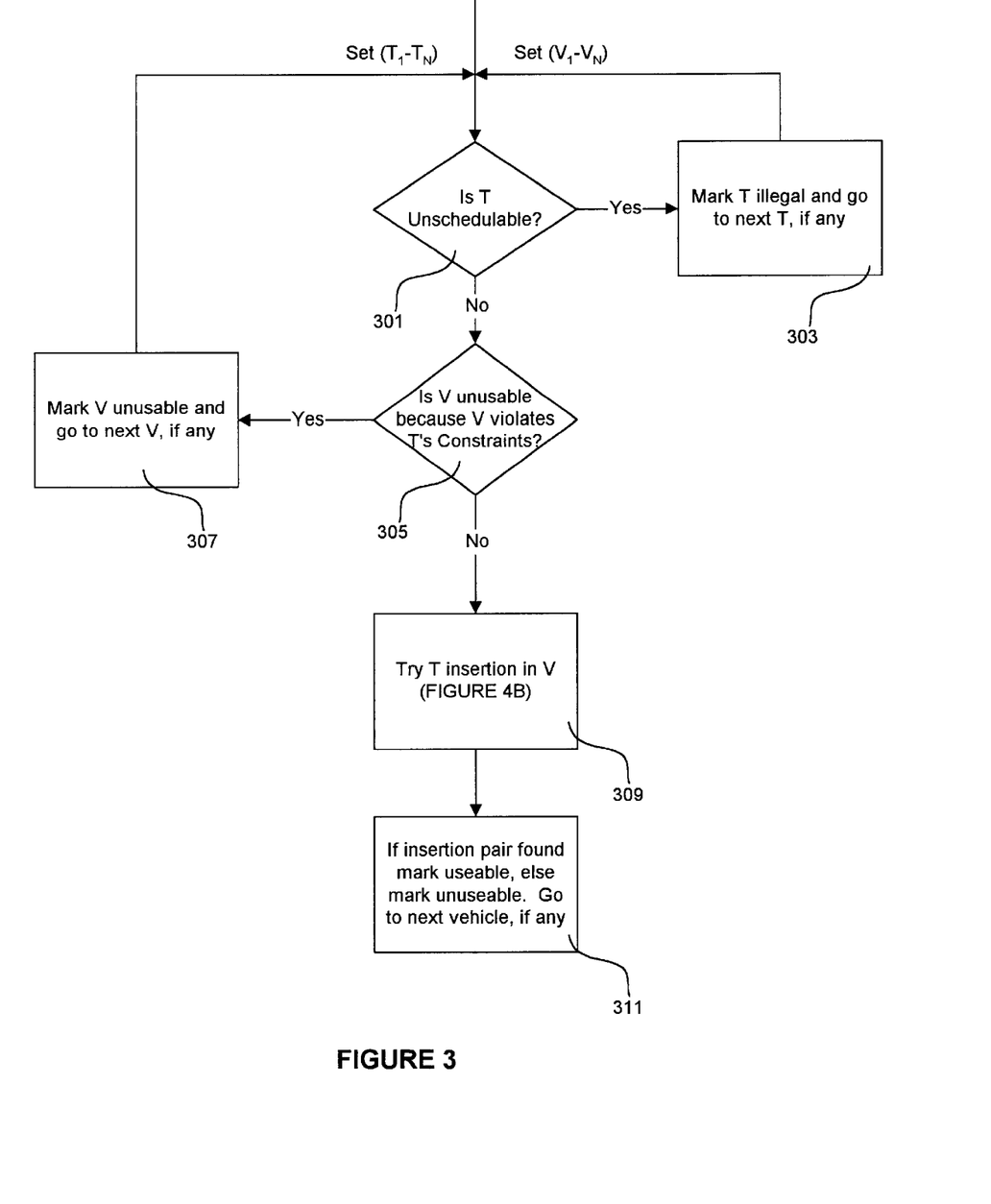
FIG. 3 is a flow diagram illustrating how the usability matrix is formed in accordance with the present invention.

The generation of the useability matrix is shown in FIG. 3. Initially, the set of all trips and the set of all vehicles is provided. The first trip in the set of trips is chosen as the initial trip to be tested. At box 301, a determination is made as to whether the trip is unschedulable. Examples of trips that are unschedulable are trips that are over a predetermined amount of time or distance. Step 301 is used to eliminate from scheduling those trips that are considered "illegal" or that simply are not supported by the transit system. If the trip is unschedulable, then at box 303, the trip is marked as illegal and the next trip in the set, if any, is processed.

If, however, the trip is not illegal, then at box 305, a determination is made as to whether or not the first vehicle in the vehicle set is satisfactory to the requirements of the trip. Examples of unsatisfactory constraints of a trip include where the trip is for a person who requires, for one reason or another, a particular vehicle or a particular driver. Thus, only a few, or even only one, of the vehicles will qualify for the trip's requirements. If the vehicle cannot meet the requirements of the trip, then at box 307, the vehicle is marked unuseable for that trip and the next vehicle is examined, if any still remain.

Figure 4A:
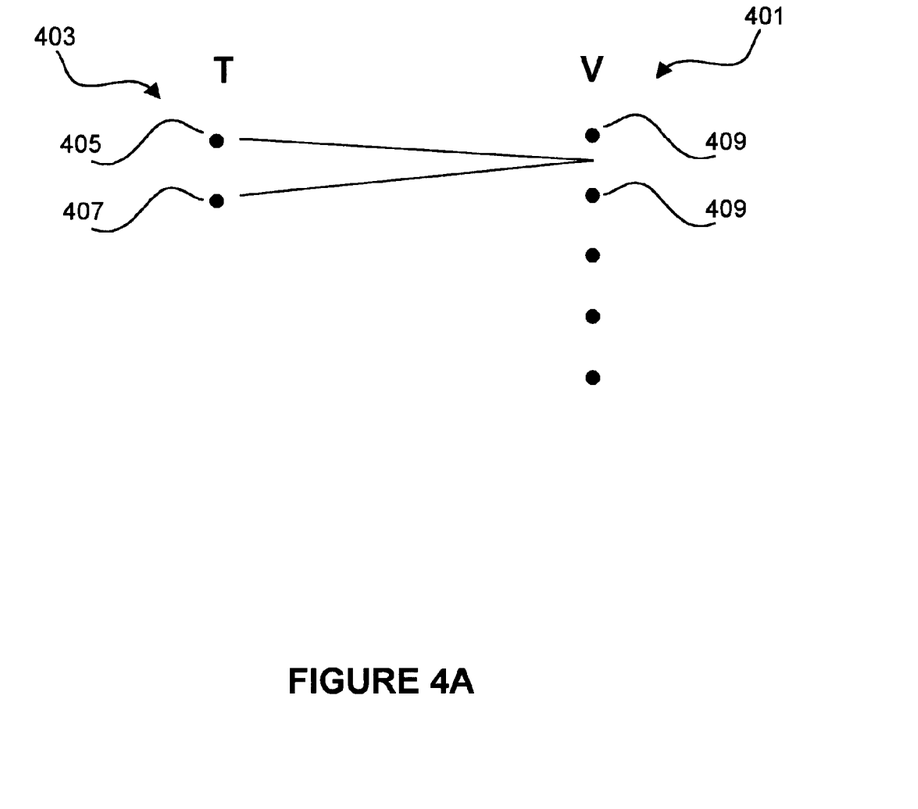
FIGS. 4A and 4B illustrate the method of determining whether or not a particular trip is schedulable on a particular vehicle.
Figure 4B:
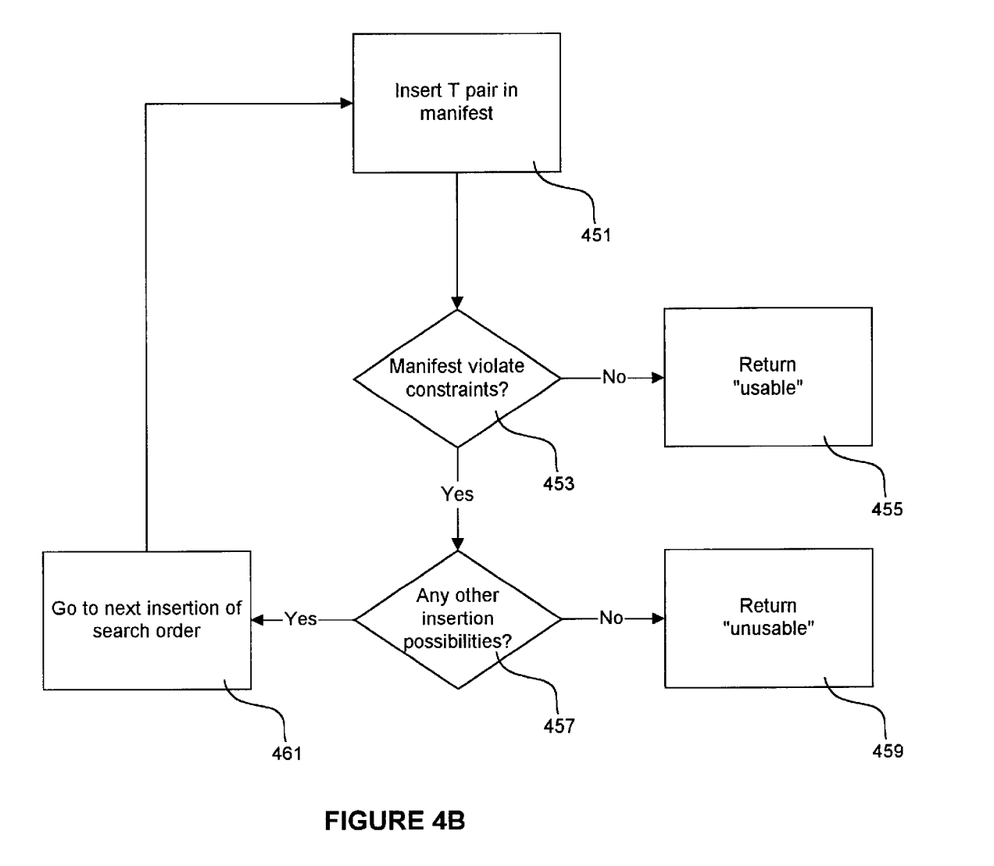

However, if the vehicle satisfies the trip's requirements, then at box 309, the trip is attempted to be inserted into the manifest of the vehicle (see FIG. 4B). Next, at box 311, if an insertion is successful, then the vehicle/trip combination is marked as useable, otherwise, the vehicle/trip combination is marked as unuseable.

Turning next to FIGS. 4A–4B, the step of determining a valid insertion pair(s) is shown in detail. FIG. 4A is a schematic diagram of a manifest 401 for a vehicle V with the trip T 403 of interest being shown as a pickup time 405 and a dropoff time 407. Stops on the vehicle manifest 401 are designated by reference numerals 409. The stops 409 can be either pickups or dropoffs of other passengers for other trips.

Turning to FIG. 4B, at box 451, the trip pickup time 405 and the dropoff time 407 are inserted into the manifest in a predetermined search order. The searching technique may be any arbitrary method, but it must ensure that all possible combinations of insertions of the pickup and dropoff for the trip be present.

Next, at box 453, the manifest is examined to determine if any constraints have been violated. The constraints are those set of rules that must be preserved in order to have a valid manifest. For example, the manifest may not have stops 409 that are either before or after the vehicle is scheduled to be off duty. The manifest may not at any instance have more passengers on board than is the capacity of the vehicle. The manifest must contain periods of no stops 409 to account for lunch and other breaks. The above is merely exemplary and is not intended to be exhaustive. More examples of the constraints may be found in the microfiche appendix. Note that the determination of whether or not a manifest violates a manifest rule requires the use of the trip parameters and the travel oracle (TOracle) described above.

If the manifest does not violate the constraints, then at box 455, the result USEABLE is returned to the usability matrix. If a manifest rule has been violated, then at box 457, a determination is made as to whether or not other insertion points are possible. If not, then at box 459, the result UNUSEABLE is returned to the usability matrix. If other insertion points still need to be investigated, then at box 461, the next insertion point in the search order is examined by going through the sequence above.

Figure 5:
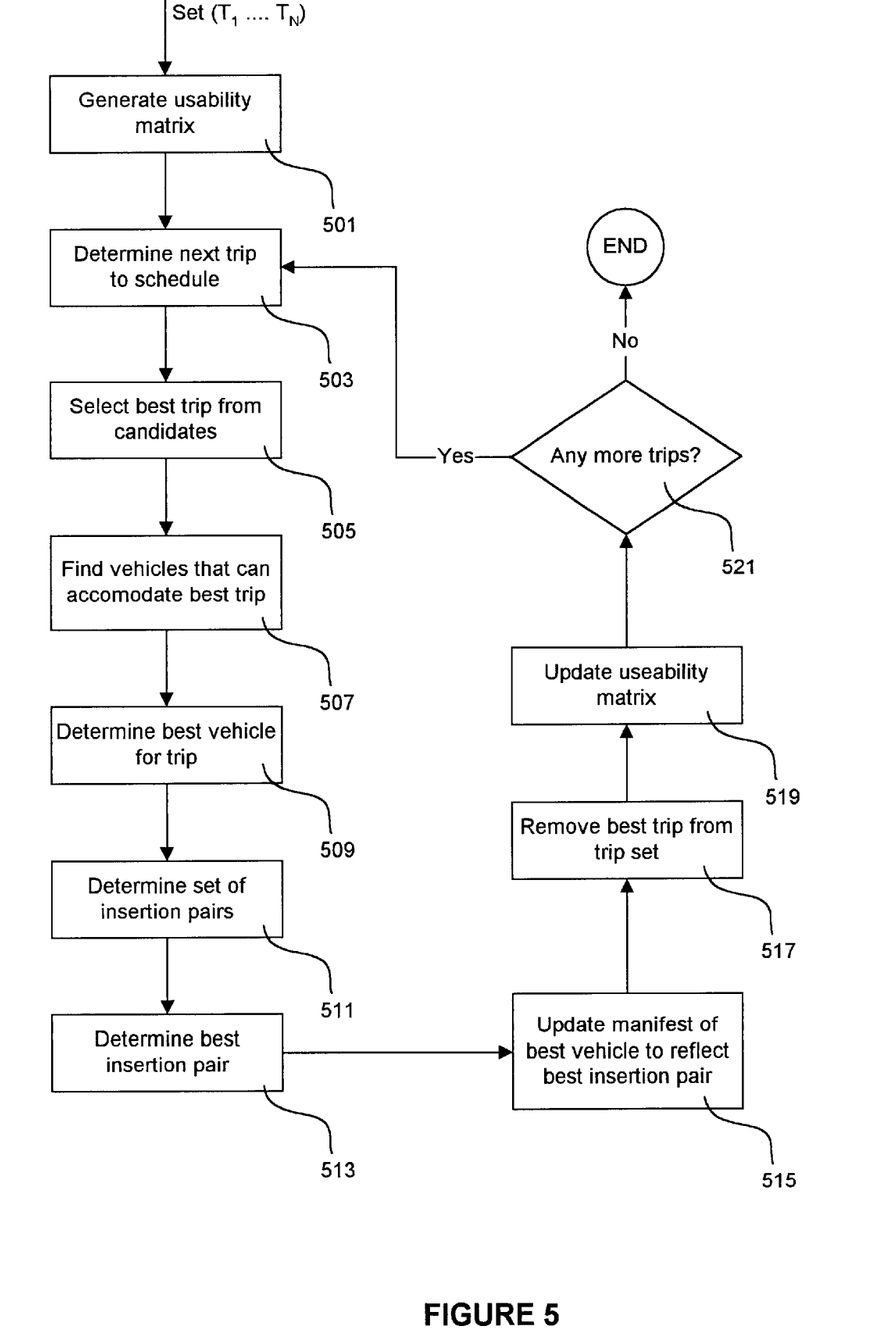
FIG. 5 is a flow diagram illustration the method of scheduling a set of trips in accordance with the present invention.

Turning now to FIG. 5, after the useability matrix is completed at box 501, the scheduler continues at box 503 by determine the next trip to be scheduled. The next trip to be scheduled initially is to be chosen from the set of total trips to be scheduled ($T_1$ to $T_n$) less those trips that were found to be "illegal" during the initial generation of the useability matrix. Of the remaining trips to be scheduled, one trip is selected as the "best" trip to be scheduled next. The selection of the best trip is performed at box 505.

Figure 6:
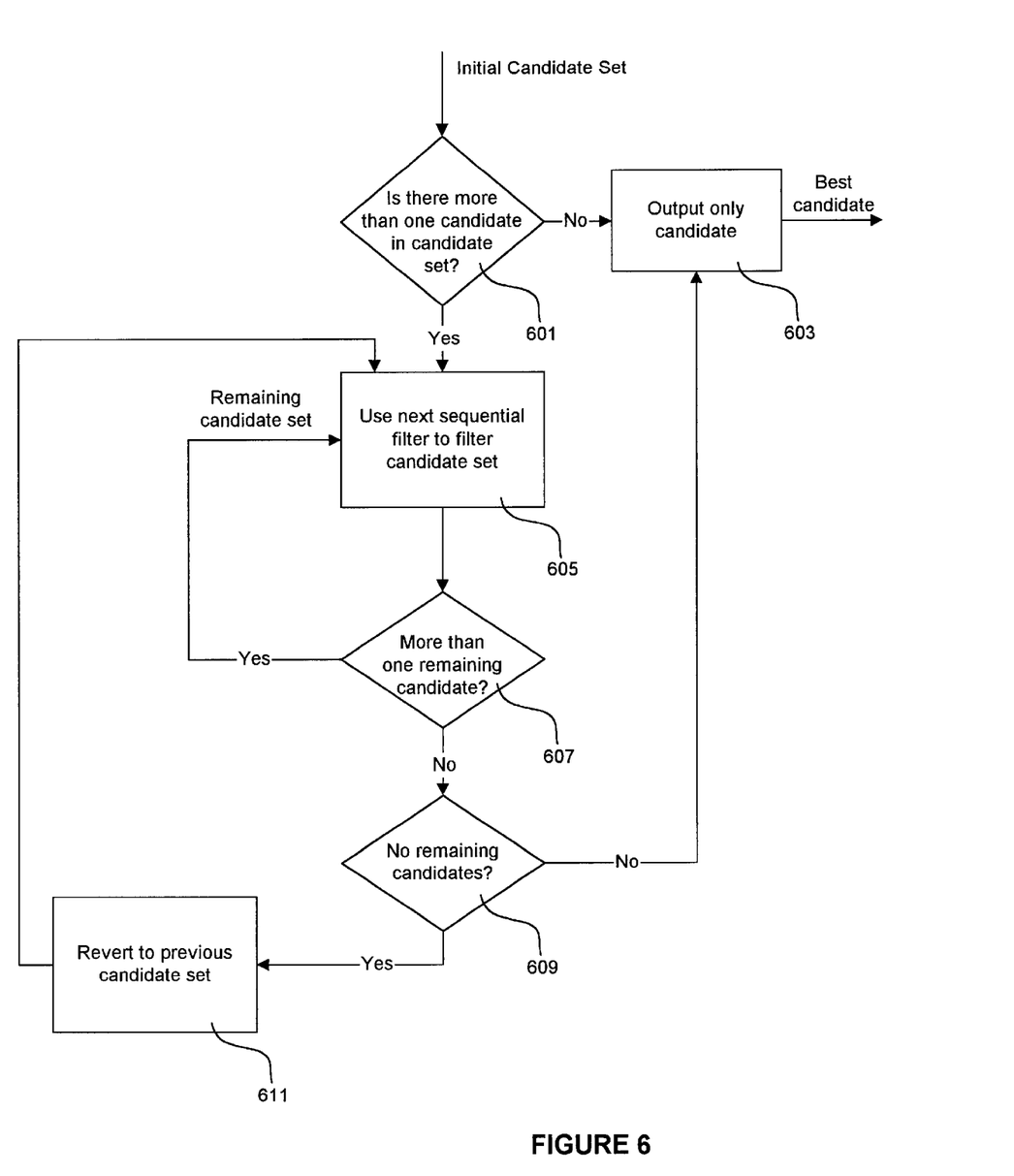
FIG. 6 is a flow diagram illustrating the method of choosing the best candidate trip/vehicle/insertion pair in accordance with the present invention.

This selection process is further detailed in FIG. 6. As seen, an initial candidate set of trips is examined at box 601 to determine if there is more than one trip in the initial candidate set. If there is not, then clearly, the best trip is the only candidate trip. Thus, at box 603, the only candidate trip is the best candidate.

However, if there is more than one candidate trip, then the next sequential filter is applied to the candidate trip set. As noted above, the type of filter and the sequence of filters will change in accordance with the current context. The context will also change as the current state of the scheduling cycle changes. After the filter has been applied at box 605, the candidate trip set will most likely be reduced in number, although, in certain circumstances, the filter may not have eliminated any of the trips in the candidate trip set.

Next, at box 607, a determination is made as to whether there is more than one remaining trip in the candidate trip set. If the answer is no, then at box 609, a determination is made as to whether or not there are no remaining candidates. If the answer is no, then the sole remaining trip in the candidate trip set is output as the best trip at box 603.

However, if the answer is yes, then it is concluded that the previous filter at box 605 has filtered out all of the trips. At this point, at box 611, the entire previous candidate trip set is processed through the next filter at box 605.

If at box 607 it is determined that there is more than one trip in the candidate trip set, then the remaining trips in the candidate trip set is passed through the next filter at box 605. This process continues until a best trip is output at box 603.

Returning to FIG. 5, after the best trip has been determined for scheduling, at box 507, the set of candidate vehicles is determined. This involves the use of the useability matrix formed in step 501 and described above. For example, referring back to FIG. 2; for trip $T_1$, all of the vehicles were able to accommodate the trip. In contrast, for trip $T_3$, only vehicle $V_1$ is able to accommodate the trip. Most trips are like trip $T_6$, where three vehicles could accommodate the trip.

Once the set of candidate vehicles has been determined, the best vehicle for accommodating the best trip is determined at box 509. This determination is performed precisely like the determination of the best trip as described above in conjunction with FIG. 6, with the exception that the selection is of vehicles instead of trips.

Now that the best trip and the best vehicle have been selected, at step 511, all of the possible insertion pairs for the best trip into the manifest of the best vehicle is generated. Referring back to FIGS. 4A and 4B, the pickup and dropoff points of the best trip are systematically inserted into the manifest of the best vehicle. All possible combinations of insertion are performed. After each insertion, the manifest is examined to determine if any constraints have been violated. If not, then that insertion pair is considered a candidate insertion pair. If the manifest violates one or more constraints, then the insertion pair is not a candidate insertion pair. Once all of the possibilities have been examined, a set of candidate insertion pairs is generated.

Next, at box 513, the best insertion pair is chosen from the set of candidate insertion pairs. This determination is performed precisely like the determination of the best trip and best vehicle as described above in conjunction with FIG. 6, with the exception that the selection is of insertion pairs instead of trips and vehicles.

Once the best insertion pair has been selected, at box 515, the manifest of the best vehicle is updated to reflect in inclusion of the best insertion pair. Next, at box 517, the best trip that was just scheduled is removed from the trip set. Next, at box 519, the useability matrix is updated. This is done in substantially the same manner as that described in FIGS. 3 and 4A–4B. Finally, at box 521, a determination is made as to whether or not any more trips remain in the trip set to be scheduled. If not, then the scheduling process is completed. If so, then the scheduling process continues at box 503.

In one actual embodiment of the above described present invention, the scheduler engine of the present invention is implemented in the C language and is shown in the attached microfiche appendix.

Although the present invention has been described in the context of transportation scheduling, it can be appreciated that the present invention may be applied to other problems. The following are example of how the present claimed invention may be used in other applications:

Plant Floor AGV Scheduling—A fleet of vehicles is responsible for shuttling materials and partially completed lots between work centers in support of production process flow. When a lot is processed at a work center, it becomes available to be moved to the queue in front of the work center specified in its practice plan (subject to minimum delay time). Since the completion of processing at a work center is unknown before the fact, scheduling must be dynamic and done in real-time. There may be no batching. This puts a premium on same-day insertion and the speed of the scheduling algorithm. Appropriate use of ride sharing, subject to minimum and maximum delay time for a lot between operations, will reduce cost and simultaneously improve production efficiency.

Truck fleet scheduling—A fleet of trucks is responsible for pickup and delivery of shipments between a set of production facilities, a set of warehouse facilities, a set of inter-modal end-points (e.g. railroad depot, dock, etc.), and a set of consumption facilities. Each shipment has a pickup window and a dropoff window representing earliest and latest time for each stop. Batching is done every night to reoptimize the schedule, looking at the entire trip set from a global view. Same-day insertion is less of an issue. In para-transit and plant-floor AGV scheduling, each day ends by resetting the model to the same root state—the fleet is in the garage. In trucking, each day starts out with the fleet located wherever they actually stopped the previous night. The primary metric of schedule quality is cost. The highway system, highway connections, and each highway's set of on-ramps and off-ramps must be modeled.

Rail car scheduling—A fleet of rail cars is responsible for pickup and delivery of shipments between depots. This problem is most similar to truck fleet scheduling. There is no same-day insertion. There is less flexibility in routing because tracks and depots are fixed. These must be modeled. Travel speeds are more controllable and reliable.

Cargo ship scheduling—A fleet of cargo ships is responsible for pickup and delivery of shipments between docks. This problem is most similar to truck fleet and rail car scheduling. There is no same-day insertion. There is less flexibility in routing because shipping lanes and depots are fixed. These must also be modeled. Travel speeds are more controllable and reliable.

Fixed route bus scheduling—A fleet of buses is responsible for pickup and delivery of passengers between bus stops on a published fixed schedule. This problem is very different. The scheduling is not a daily event. It is based on using historical data to optimally set the bus routes to provide the best service at the lowest cost. This schedule is published and fixed for long periods of time, sometimes years. In the above applications, the model and strategy are fixed and the problem changes every day. In fixed route bus scheduling, the historical data is used to construct a generic one-day problem. The model and strategy are changed for each run to generate different candidate schedules for that problem. The emphasis is on what-if analysis for solving the generic problem. The best schedule is published as the fixed schedule. There is no same-day insertion.

Airplane fleet scheduling—A fleet of planes is responsible for pickup and delivery of passengers on a published fixed schedule between airports. This problem is most similar to fixed route bus scheduling.

Thus, although specific embodiments, including the preferred embodiment, have been illustrated and described, it will be obvious to those skilled in the art that various modifications may be made without departing from the spirit which is intended to be limited solely by the appended claims.

The embodiments of the invention in which an exclusive property or privilege is claimed are defined as follows:

1. An improved transportation scheduling method for scheduling a plurality of trips $T_1$–$T_n$ using a plurality of vehicles $V_1$–$V_n$, each of said plurality of vehicles having a trip manifest, said method comprising:

(a) generating a useability matrix that determines which of said plurality of vehicles $V_1$–$V_n$ is useable with each of said plurality of trips $T_1$–$T_n$, said usability matrix having along one axis said plurality of trips $T_1$–$T_n$;

(b) determining a best trip of said plurality of trips $T_1$–$T_n$ to be scheduled next;

(c) determining a best vehicle from said plurality of vehicles $V_1$–$V_n$ for accommodating said best trip;

(d) determining a best insertion pair into said trip manifest of said best vehicle for said best trip and updating said trip manifest to include said best insertion pair;

(e) updating said useability matrix to reflect the scheduling of said best trip on said best vehicle and removing said best trip from said plurality of trips $T_1$–$T_n$;

(f) repeating steps (a)–(e) until all of the trips in said plurality of trips $T_1$–$T_n$ have been scheduled; and (g) having said plurality of vehicles $V_1$–$V_n$ execute their respective said trip manifests.

2. The method of claim 1 wherein said step of determining said best trip comprises: passing a plurality of candidate trips, said plurality of candidate trips being the group of said plurality of trips $T_1$–$T_n$ that have yet to be scheduled, through one or more trip filters so as to eliminate all but one of said plurality of candidate trips, the remaining candidate trip being said best trip.

3. The method of claim 2 wherein the ordering and composition of said one or more trip filters changes as said plurality of trips $T_1$–Tn are being scheduled.

4. The method of claim 1 wherein said step of determining said best vehicle comprises: passing a plurality of candidate vehicles, said plurality of candidate trips being the group of said plurality of vehicles $V_1$–$V_n$ that according to the useability matrix can accommodate said best trip, through one or more vehicle filters so as to eliminate all but one of said plurality of candidate vehicles, the remaining candidate vehicle being said best vehicle.

5. The method of claim 4 wherein the ordering and composition of said one or more vehicle filters changes as said plurality of trips $T_1$–$T_n$ are being scheduled.

6. The method of claim 1 further including the step of generating a set of candidate insertion pairs by exhaustively examining all possible insertion pairs to said trip manifest and forming said set of candidate insertion pairs from those insertion pairs that satisfy a set of constraints.

7. The method of claim 6 wherein said step of determining said best insertion pair comprises: passing said set of candidate insertion pairs through one or more insertion pair filters so as to eliminate all but one of said insertion pairs in said set of candidate insertion pairs, the remaining insertion pair being said best insertion pair.

8. The method of claim 7 wherein the ordering and composition of said one or more insertion pair filters changes as said plurality of trips $T_1$–$T_n$ are being scheduled.

9. The method of claim 2 further including the step of generating a set of candidate insertion pairs by exhaustively examining all possible insertion pairs to said trip manifest and forming said set of candidate insertion pairs from those insertion pairs that satisfy a set of constraints.

10. The method of claim 9 wherein said step of determining said best insertion pair comprises: passing said set of candidate insertion pairs through one or more insertion pair filters so as to eliminate all but one of said insertion pairs in said set of candidate insertion pairs, the remaining insertion pair being said best insertion pair.

11. The method of claim 10 wherein the ordering and composition of said one or more insertion pair filters changes as said plurality of trips $T_1$–$T_n$ are being scheduled.

12. The method of claim 4 further including the step of generating a set of candidate insertion pairs by exhaustively examining all possible insertion pairs to said trip manifest and forming said set of candidate insertion pairs from those insertion pairs that satisfy a set of constraints.

13. The method of claim 12 wherein said step of determining said best insertion pair comprises: passing said set of candidate insertion pairs through one or more insertion pair filters so as to eliminate all but one of said insertion pairs in said set of candidate insertion pairs, the remaining insertion pair being said best insertion pair.

14. The method of claim 13 wherein the ordering and composition of said one or more insertion pair filters changes as said plurality of trips $T_1$–$T_n$ are being scheduled.

* * * * *